US009339977B2

(12) United States Patent
Shimaoka et al.

(10) Patent No.: US 9,339,977 B2
(45) Date of Patent: May 17, 2016

(54) SPREAD ILLUMINATING APPARATUS AND METHOD FOR MANUFACTURING A LIGHT GUIDE PLATE

(71) Applicant: MINEBEA CO., LTD., Kitasaku-gun, Nagano (JP)

(72) Inventors: Reishi Shimaoka, Kakegawa (JP); Shinji Kawai, Iwata (JP)

(73) Assignee: MINEBEA CO., LTD., Kitasaku-Gun (JP)

( * ) Notice: Subject to any disclaimer, the term of this patent is extended or adjusted under 35 U.S.C. 154(b) by 0 days.

(21) Appl. No.: 14/311,726

(22) Filed: Jun. 23, 2014

(65) Prior Publication Data

US 2015/0036382 A1 Feb. 5, 2015

(30) Foreign Application Priority Data

Jul. 31, 2013 (JP) ................................. 2013-159195
Apr. 11, 2014 (JP) ................................. 2014-082029

(51) Int. Cl.
*F21V 8/00* (2006.01)
*B29D 11/00* (2006.01)

(52) U.S. Cl.
CPC ........ *B29D 11/00663* (2013.01); *G02B 6/0016* (2013.01); *G02B 6/0065* (2013.01)

(58) Field of Classification Search
CPC .... G02B 6/002; G02B 6/0016; G02B 6/0025; G02B 6/0028; G02B 6/0073; G02F 1/133603; G02F 1/133615
USPC .................................................. 362/621, 237
See application file for complete search history.

(56) References Cited

U.S. PATENT DOCUMENTS

| 7,097,341 | B2 * | 8/2006 | Tsai ............................... 362/625 |
| 7,156,548 | B2 * | 1/2007 | Teng et al. ..................... 362/625 |
| 7,160,016 | B2 * | 1/2007 | Yu et al. ........................ 362/620 |
| 7,273,311 | B2 * | 9/2007 | Yu .................................. 362/620 |
| 8,419,263 | B2 * | 4/2013 | Wang et al. ................... 362/623 |
| 2007/0139968 | A1 * | 6/2007 | Chang ............................ 362/621 |
| 2010/0302800 | A1 * | 12/2010 | Yang et al. ..................... 362/606 |
| 2011/0241573 | A1 * | 10/2011 | Tsai et al. ...................... 315/312 |

FOREIGN PATENT DOCUMENTS

| JP | A-2004-145035 | 5/2004 |
| JP | A-2006-171253 | 6/2006 |

* cited by examiner

*Primary Examiner* — Tracie Y Green
(74) *Attorney, Agent, or Firm* — Oliff PLC

(57) ABSTRACT

Optical elements of a light guide plate are formed by repeatedly aligning convex parts in a longitudinal direction of the optical elements. Concave/convex shaped parts whose recess amount and/or protrusion amount are not constant are formed by three-dimensional curved surfaces that constitute the convex parts. An optical path of light that enters from an incident light surface of the light guide plate is modified by the concave/convex shaped parts that constitute the optical elements as the light progresses through the inside of the light guide plate, and thereby the light is diffused. Further, since the recess amount and/or protrusion amount of the concave/convex shaped parts are not constant, the optical path of light progressing through the inside of the light guide plate is modified randomly, and therefore a light diffusing effect is efficiently exhibited.

21 Claims, 7 Drawing Sheets

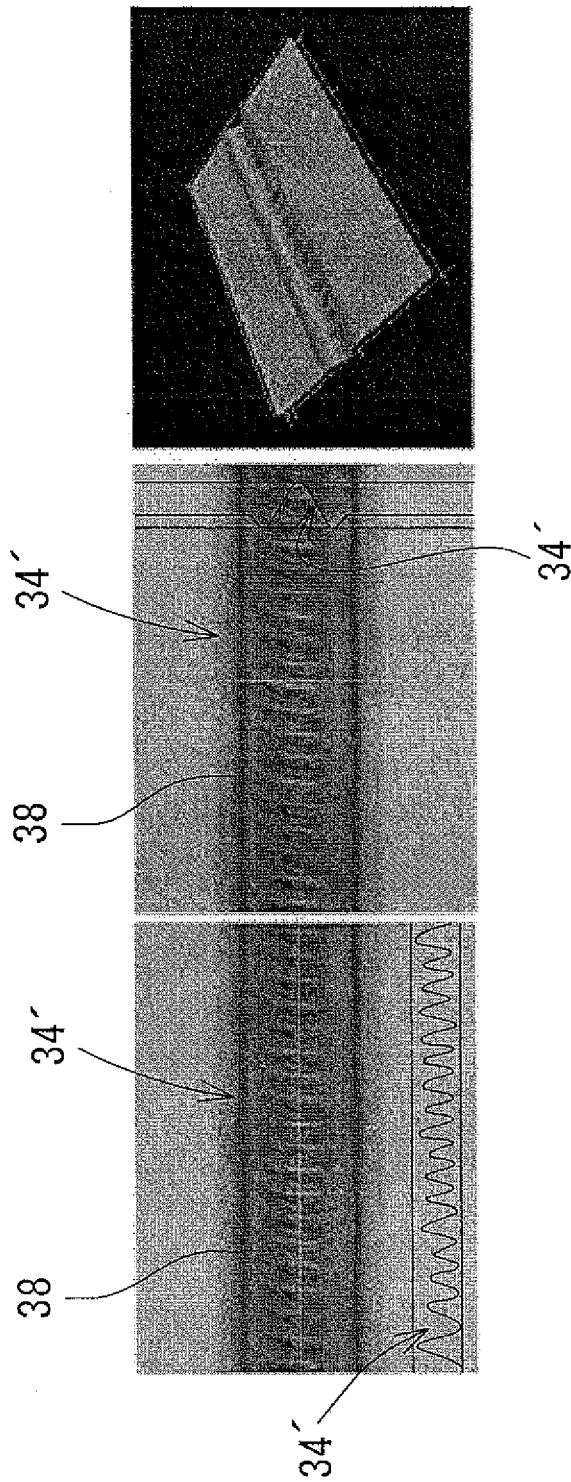

F I G. 6
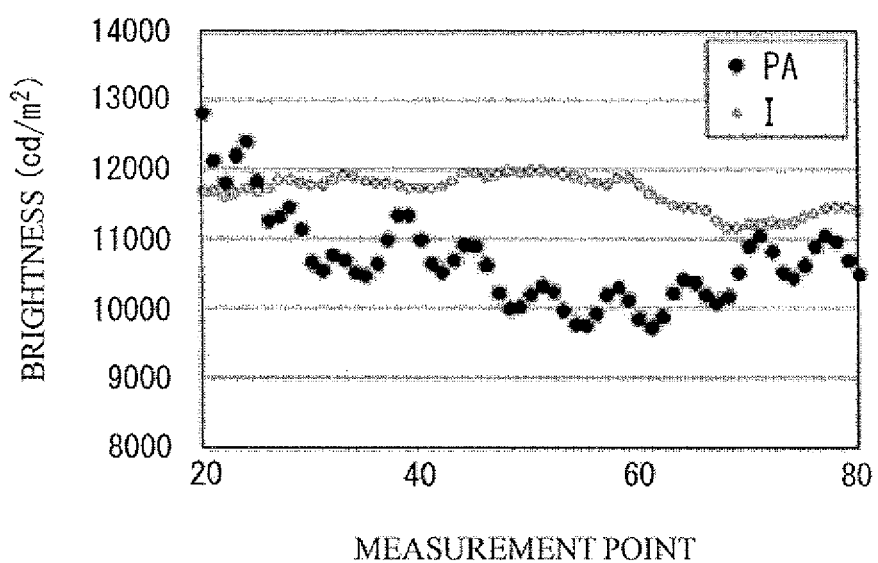

SPREAD ILLUMINATING APPARATUS AND METHOD FOR MANUFACTURING A LIGHT GUIDE PLATE

BACKGROUND OF THE INVENTION

1. Field of the Invention

The present invention relates to a spread illuminating apparatus that is used as an illumination unit of a liquid crystal display device or the like, and a method for manufacturing a light guide plate of the spread illuminating apparatus.

2. Description of the Related Art

Liquid crystal display devices are now regularly used as display devices of electronic apparatuses such as personal computers and mobile telephones. Liquid crystal is not a self-luminous display element, and thus in, for example, a transmissive liquid crystal display device, an illumination unit for irradiating light onto a liquid crystal panel is required. Even in a semi-transmissive liquid crystal display device that utilizes external light, an auxiliary illumination unit is provided in order to enable use in dark places. As such the illumination unit for the liquid crystal display device, a spread illuminating apparatus including a light guide plate and a light source disposed to the side of the light guide plate as the main constituent elements is widely used in combination with the liquid crystal display device because such the spread illuminating apparatus has an advantage of being easy to make thin. Further, recent enhancement in the performance of white light-emitting diodes (LEDs) has enabled further reductions in the size, thickness, and power consumption of spread illuminating apparatuses. Thus, spread illuminating apparatuses utilizing white LEDs as a light source are now regularly used.

An example of such a spread illuminating apparatus will now be explained with reference to the constitution (FIG. 8) of a spread illuminating apparatus 10 according to an embodiment of the present invention to be explained later.

The spread illuminating apparatus 10 has a basic constitution in which a light guide plate 12 and LEDs 14 disposed opposing an incident light surface 12c of the light guide plate 12 are accommodated in a housing frame 16. The LEDs 14 are point light sources, and thus when light L emitted from the LEDs 14 enters into the light guide plate 12 from the incident light surface 12c, there are cases in which brightness unevenness referred to as brightness spots or hot spots may occur. Such brightness unevenness may impair the uniformity of the brightness at a light emitting surface 12a of the light guide plate 12. Thus, the following measures have conventionally been proposed for the purpose of overcoming the problem of brightness unevenness.

For example, an example has been proposed in which crimps are formed across the entire surface of the light emitting surface 12a of the light guide plate 12, and the crimps are formed such that the crimp density is low at portions of the light emitting surface 12a in front of the LEDs 14 where the brightness is high and the crimp density is high at portions of the light emitting surface 12a between the LEDs 14 where the brightness is low (for example, refer to JP 2004-145035 A).

Further, in another example, a plurality of grooves with a V-shaped cross section are formed on the emitting surface 12a side of the light guide plate 12 to extend forward from the incident light surface 12c of the light guide plate 12 (toward a light-emitting area side of the light guide plate 12). In this example, the plurality of grooves with the V-shaped cross section are formed such that the depth thereof gradually decreases from the end at the incident light surface 12c side toward the forward direction (for example, refer to JP 2006-171253 A).

SUMMARY OF THE INVENTION

In the example in which crimps are formed on the light emitting surface 12a of the light guide plate 12 such that the crimp density differs in consideration of the positional relationship with the LEDs 14 as disclosed in JP 2004-145035 A, light that enters into the emitting surface 12a from the LEDs 14 is greatly scattered due to the crimps between adjacent LEDs 14. As a result, dark sections are eliminated, and thus an effect of eliminating brightness unevenness has been confirmed. However, if a resin material having a large thermal expansion coefficient is used for the light guide plate 12 or the size of the light guide plate 12 is relatively large (for example, in the case of a so-called tablet size spread illuminating apparatus), there has been a problem in that positional deviations in the longitudinal direction of the incident light surface 12c occur between the light guide plate 12 and the LEDs 14 due to temperature differences, and thus an optimal brightness distribution cannot be achieved.

Meanwhile, in the example in which a plurality of grooves with a V-shaped cross section are formed extending forward from the incident light surface 12c of the light guide plate 12 as disclosed in JP 2006-171253 A, some of the light that enters into the emitting surface 12a from the LEDs 14 is reflected on the surface constituting the grooves with the V-shaped cross section. As a result, the light diffuses within the light guide plate 12 as it progresses, and thus an effect of eliminating brightness unevenness has been confirmed. However, there are problems in that a large amount of processing time is required to form the grooves with the V-shaped cross section, maintenance with respect to wear of the processing tools is also needed, and there are difficulties in processing on thin sheet materials. Further, in order to form the grooves such that the depth thereof gradually decreases from the end at the incident light surface 12c side toward the forward direction, control is necessary to tilt the object of processing or change the height direction of the processing machine, and this may lead to an increase in the processing man-hours.

In addition, when using a spread illuminating apparatus as an illumination unit of a liquid crystal display panel, further reductions in brightness unevenness of the spread illuminating apparatus that cannot be achieved in the above-described related art is needed to meet the demands of high definition liquid crystal display panels and the like. In particular, in addition to brightness unevenness that is visible when viewing the emitting surface of the light guide plate from the front direction, some recent cases also demand reductions in brightness unevenness that is visible when viewing the emitting surface of the light guide plate from a diagonal direction.

The present invention was created in consideration of the above-described problems, and an object thereof is to achieve further reductions in brightness unevenness of a spread illuminating apparatus, and to provide a technology for efficient manufacture of a light guide plate that enables further reductions in brightness unevenness of a spread illuminating apparatus.

The embodiments of the invention described below are examples of the structure of the present invention. In order to facilitate the understanding of the various structures of the present invention, the explanations below are divided into aspects. Each aspect does not limit the technical scope of the present invention, and the technical scope of the present invention can also include structures in which a portion of the components in the aspects below is substituted or deleted, or another component is added upon referring to the best modes for carrying out the invention.

In order to achieve the object described above, according to a first aspect of the present invention, there is provided a spread illuminating apparatus including: a light source; and a light guide plate including an incident light surface at which the light source is disposed and a principal surface adjacent to the incident light surface, wherein a plurality of optical elements formed linearly are provided in a region of the principal surface of the light guide plate having a predetermined width from an end adjacent to the incident light surface, and each of the plurality of optical elements has a concave/convex shaped part in which concave parts and/or convex parts are repeatedly aligned in a longitudinal direction of the optical elements.

With this structure, the spread illuminating apparatus includes a plurality of linear (forming a stripe-shaped continuous body) optical elements in a region of the principal surface of the light guide plate having a predetermined width from an end adjacent to the incident light surface. Each of the optical elements has a concave/convex shaped part, in which three-dimensional concave parts and/or convex parts are repeatedly aligned in the longitudinal direction of the optical elements. An optical path of light that enters from the incident light surface of the light guide plate is modified by the concave/convex shaped parts that constitute the optical elements while the light is progressing through the inside of the light guide plate, and thereby the light is diffused. Further, a recess amount and/or protrusion amount of the concave/convex shaped parts are not constant, and thus the optical path of light progressing through the inside of the light guide plate is modified randomly. Therefore, a light diffusing effect is efficiently exhibited. Also, by providing a plurality of optical elements, the above-described effects are achieved by each of the plurality of optical elements.

The concave/convex shaped parts are not limited to an embodiment in which concave parts and/or convex parts are regularly repeated in the longitudinal direction of the optimal elements. For example, the concave parts and/or convex parts can be repeated non-periodically or irregularly, such as by making the height (depth) or pitch of each concave part and/or convex part unequal. The concave/convex shaped parts also include a case in which the concave/convex shapes are not clearly concave or convex and relative differences in height occur irregularly, and a case in which microscopic concavities or convexities are superimposed on macroscopic concave/convex shapes.

In addition, the optical elements are not limited to those formed by only the concave/convex shaped part, and include optical elements in which the concave/convex shaped part is formed in a portion of the width-direction (shorter-dimension direction) (for example, the center in the width direction) of the linearly-formed optical elements.

In the spread illuminating apparatus according to the first aspect, the concave/convex shaped part is arranged such that adjacent concave parts or convex parts partially overlap each other in a plan view of the principal surface.

With this structure, each concave/convex shaped part is arranged such that adjacent concave parts or convex parts partially overlap each other in a plan view of the principal surface. Thereby, compared to a concave/convex shaped part in which adjacent concave parts or convex parts are formed to be arranged discretely, an inclination angle of a three-dimensional shape that constitutes the concave/convex shaped part can be appropriately set. In other words, if each concave part or convex part is constituted by a three-dimensional curved surface whose inclination angle changes regularly such as a dome shape, the inclination angle of the three-dimensional curved surface increases approaching outer edge parts. On the other hand, if adjacent concave parts or convex parts are arranged to partially overlap each other, the outer edge parts of the three-dimensional curved surface that constitutes each concave part or convex part are clipped off by adjacent concave parts or convex parts such that they become linearly aligned. Since the outer edge parts which have a large inclination angle are clipped off, the effect of modifying the optical path of light that progresses through the inside of the light guide plate is reduced, which allows for an increase in the amount of light that progresses farther from the incident light surface. Therefore, the amount of light emitted from regions of the principal surface of the light guide plate that are farther from the incident light surface increases, and thus a light diffusing effect is efficiently exhibited. Further, the amount of light emitted from dead areas is suppressed, and thus the efficiency of light utilization is improved.

In the spread illuminating apparatus according to the first aspect, an arc-shaped part is included in a cross-section of the concave/convex shaped part along the longitudinal direction of the optical elements.

With this structure, an arc-shaped part is included in a cross-section of the concave/convex shaped part that constitutes each optical element along the longitudinal direction of the optical element. Thus, the inclination angle of the three-dimensional shape that constitutes each concave part and/or convex part is not constant toward the longitudinal direction of the optical element and changes according to the arc shape. Therefore, the optical path of light that progresses through the inside of the light guide plate is randomly modified toward different directions at different positions in the longitudinal direction of the optical elements, and thus a light diffusing effect is efficiently exhibited.

In the spread illuminating apparatus according to the first aspect, a ridge line extending to connect one end side in a shorter-dimension direction of the optical elements to the other end side in an arc shape is included in the concave/convex shaped part in a plan view of the principal surface.

With this structure, a ridge line extending to connect one end side in the shorter-dimension direction of the optical element to the other end side in an arc shape is included in each concave/convex shaped part in a plan view of the principal surface. Therefore, the inclination angle in the shorter-dimension direction is also not constant and changes according to the are shape, and thus a light diffusing effect is efficiently exhibited with respect to this point as well. Further, the inclination angle of the three-dimensional shape that constitutes each concave/convex shaped part changes rapidly crossing over the ridge line. Therefore, the deflection direction of the optical path of light that progresses through the inside of the light guide plate clearly differs as the optical path crosses over the ridge line, and thus a light diffusing effect is efficiently exhibited.

In the spread illuminating apparatus according to the first aspect, the concave parts and/or convex parts that constitute the concave/convex shaped part are dome-shaped.

With this structure, the concave parts and/or convex parts that constitute each concave/convex shaped part are dome-shaped, and a plurality of the concave parts and/or convex parts are continuously formed to be linear overall. Thereby, the above-described effects are achieved.

In the spread illuminating apparatus according to the first aspect, the optical elements extend parallel to each other in a direction away from the incident light surface.

With this structure, the optical elements extend parallel to each other in a direction away from the incident light surface. Thereby, the optical path of light that enters from the incident light surface of the light guide plate is modified by the concave/convex shaped parts that constitute the optical elements while the light is progressing through the inside of the light guide plate toward a direction away from the incident light surface. Thus, the above-described effects are achieved.

In the spread illuminating apparatus according to the first aspect, the optical elements are formed such that a protrusion amount and/or recess amount of the concave/convex shaped parts decreases as the distance from the incident light surface increases.

With this structure, the optical elements are formed such that the protrusion amount and/or recess amount of the concave/convex shaped parts decreases as the distance from the incident light surface increases, and the average width of the optical elements that are formed to be linear overall decreases towards the distal tip thereof, whereas the average height (or depth) decreases towards the distal tip. Therefore, if each concave part or convex part is constituted by a three-dimensional curved surface whose inclination angle changes regularly such as a dome shape, the inclination angle of the three-dimensional curved surface that constitutes each concave part or convex part at the outer edge parts of the concave part or convex part becomes gentler as the protrusion amount and/or recess amount decreases. Thus, the effect of modifying the optical path of light that progresses through the inside of the light guide plate is reduced toward the distal tip of the optical elements, and the perception of bright lines on the principal surface of the light guide plate can be avoided.

The optical elements do not necessarily need to be formed in a straight line, and can be, for example, polygonal, curved, or a circular stripe. By forming optical elements constituted so as to present various trajectories such that the protrusion amount and/or recess amount of the concave/convex shaped parts decreases as the distance from the incident light surface increases, the above-described effects are achieved.

In order to achieve the object described above, according to a second aspect of the present invention, there is provided a method for manufacturing a light guide plate, the light guide plate including an incident light surface at which a light source is disposed and a principal surface adjacent to the incident light surface, wherein a plurality of optical elements formed linearly are provided in a region of the principal surface having a predetermined width from an end adjacent to the incident light surface, and each of the plurality of optical elements has a concave/convex shaped part in which concave parts and/or convex parts are repeatedly aligned in a longitudinal direction of the optical elements, the method including forming a plurality of the optical elements by carrying out an operation for forming concave parts and/or convex parts at a predetermined feeding pitch so that the concave parts and/or convex parts partially overlap each other in a region of the light guide plate in which the optical elements are to be provided.

In this aspect, a plurality of optical elements formed to be linear overall are formed by repeatedly aligning concave parts and/or convex parts in a region of a principal surface of a light guide plate having a predetermined width from the end adjacent to an incident light surface to form concave/convex shaped parts. In doing so, an operation for forming the concave parts and/or convex parts is carried out at a predetermined feeding pitch (which does not need to be constant) so that the concave parts and/or convex parts partially overlap each other in the region of the light guide plate in which the optical elements are to be provided, thereby forming a plurality of optical elements that are linear overall.

An optical path of light that enters from the incident light surface of the light guide plate manufactured by the above-described method is modified by the concave/convex shaped parts that constitute the optical elements while the light is progressing through the inside of the light guide plate, and thereby the light is diffused. Further, the recess amount and/or protrusion amount of the concave/convex shaped parts are not constant, and thus the optical path of light progressing through the inside of the light guide plate is modified randomly. Therefore, a light diffusing effect is efficiently exhibited.

In this aspect, a case in which the optical elements are directly formed on a plate material that constitutes the light guide plate is also included.

In the method for manufacturing a light guide plate according to the second aspect, the method includes a die producing step in which a die for molding the light guide plate is produced, and a light guide plate molding step in which the light guide plate is molded using the die produced in the die producing step, wherein the die producing step includes a groove processing step in which a plurality of concave parts are formed in a region of a molding surface of the die corresponding to the optical elements, and therein, an operation for forming the concave parts is carried out at a predetermined feeding pitch so that the concave parts partially overlap each other, thereby forming grooves corresponding to the optical elements, and in the light guide plate molding step, a shape of the molding surface of the die produced in the die producing step is transferred to a resin for constituting the light guide plate.

In this aspect, a die producing step in which a die for molding the light guide plate is produced is included, and the light guide plate is molded in a light guide plate molding step using the die produced in the die producing step. The die producing step includes a groove processing step in which a plurality of concave parts are formed in a region of a molding surface of the die corresponding to the optical elements, and therein, an operation for forming the concave parts is carried out at a predetermined feeding pitch so that the concave parts partially overlap each other, thereby forming grooves corresponding to the optical elements. In the light guide plate molding step, a shape of the molding surface of the die produced in the die producing step is transferred to a resin for constituting the light guide plate, and thereby the predetermined optical elements are molded.

In the die producing step, the method for forming the grooves corresponding to the optical elements is not particularly limited. For example, a method in which a punch is punched onto the molding surface of the die can also be utilized.

Further, when injection molding is carried out in the light guide plate molding step, molten resin that has been filled into the die is solidified to replicate the die molding surface, and thereby a light guide plate onto which the shape of the molding surface of the die has been transferred is obtained.

In the method for manufacturing a light guide plate according to the second aspect, a recess amount of each concave part to be formed is decreased in each operation for forming the concave parts.

In this aspect, in the die producing step, when carrying out the operation for forming the concave parts at a predetermined feeding pitch in the region of the die in which the optical elements are formed, the grooves corresponding to the optical elements are formed such that the recess amount of each concave part to be formed is decreased in each operation for forming the concave parts. In the light guide plate molding step, by transferring the shape of the molding surface of the die produced in the die producing step to a resin for constituting the light guide plate, the optical elements are formed such that the protrusion amount and/or recess amount of the concave/convex shaped parts decreases as the distance from the incident light surface increases. As a result, in the optical elements that are formed to be linear overall, the inclination angle of the three-dimensional curved surface that constitutes each concave part or convex part at the outer edge parts of the concave part or convex part becomes gentler as the distance from the incident light surface of the light guide plate increases. Thus, the effect of modifying the optical path of light that progresses through the inside of the light guide plate is reduced at the end farthest from the incident light surface of the light guide plate, and the perception of bright lines on the principal surface of the light guide plate can be avoided.

In the method for manufacturing a light guide plate according to the second aspect, the groove processing step is repeated, and in a second and subsequent groove processing steps, an operation for forming the concave parts is carried out at a predetermined feeding pitch in order to form concave parts at intermediate positions between adjacent concave parts formed in the previous groove processing step(s).

In this aspect, in the die producing step, when forming the grooves corresponding to the optical elements, rather than forming grooves of a desired shape in a single groove forming step, grooves of a desired shape are obtained through the plurality of groove processing steps. In other words, in a first groove processing step, the concave parts can be formed so as to partially overlap each other, or the concave parts can be formed discretely by providing a space between the concave parts without the concave parts partially overlapping each other. In a second and subsequent groove processing steps, an operation for forming concave parts is carried out at a predetermined feeding pitch at intermediate positions between adjacent concave parts formed in the previous groove processing step(s), and thereby the concave parts are formed more adjacent to each other such that they partially overlap each other. Further, the overlap between concave parts is arbitrarily adjusted according to the number of groove processing steps to be carried out.

In the method for manufacturing a light guide plate according to the second aspect, the groove processing step includes a laser irradiation step in which a plurality of concave parts are formed by carrying out laser irradiation in the region of the molding surface of the die corresponding to the optical elements, and in doing so, a laser beam is irradiated at a predetermined feeding pitch to form the concave parts such that they are adjacent to each other and partially overlap each other, thereby forming grooves corresponding to the optical elements.

In this aspect, in the groove processing step(s), the groove processing is carried out by a laser irradiation step. In other words, the plurality of concave parts are formed by carrying out laser irradiation in the region of the molding surface of the die corresponding to the optical elements. In doing so, a laser beam is irradiated at a predetermined feeding pitch to form the concave parts such that they are adjacent to each other and partially overlap each other, thereby forming grooves corresponding to the optical elements.

Further, the groove processing is carried out by pulse oscillation of the laser beam when irradiating it on the die, and thereby the processing of grooves exhibiting anisotropy including three-dimensional shapes whose cross-section shapes do not change monotonically can be carried out in a short amount of time.

In the method for manufacturing a light guide plate according to the second aspect, a recess amount of the concave parts is adjusted by a number of irradiation shots of the laser beam.

In this aspect, the recess amount of the concave parts to be formed is appropriately adjusted by adjusting the number of irradiation shots of the laser beam. Thus, by arbitrarily modifying the depths of the grooves that are formed on the die according to the position in the longitudinal direction of the grooves, the height of the optical elements on the light guide plate that are transferred from the grooves is arbitrarily changed at the position in the longitudinal direction of the optical elements.

In order to achieve the object described above, according to a third aspect of the present invention, there is provided a spread illuminating apparatus including a light guide plate manufactured by the manufacturing method according to the above second aspect, and a point light source.

With this structure, by including a light guide plate manufactured by the manufacturing method according to the second aspect above and a point light source, a spread illuminating apparatus having functions equivalent to those of the spread illuminating apparatus according to the first aspect above would be obtainable.

With the structures described above, further reductions in brightness unevenness of a spread illuminating apparatus can be achieved, and a light guide plate that enables further reductions in brightness unevenness of a spread illuminating apparatus can be efficiently manufactured.

BRIEF DESCRIPTION OF DRAWINGS

FIGS. 1A to 1C show a light guide plate of a spread illuminating apparatus according to an embodiment of the present invention, wherein FIG. 1A is a plan view and an essential part enlarged view of the light guide plate, FIG. 1B is a side surface view and an essential part enlarged view of the light guide plate, and FIG. 1C is a more detailed view of the essential part enlarged view shown in FIG. 1B;

FIGS. 2A to 2C show grooves of a die for forming optical elements of the light guide plate of the spread illuminating apparatus according to an embodiment of the present invention, wherein FIG. 2A is a plan view and a longitudinal direction cross-section view (concave/convex profile of a width direction center portion) of the grooves, FIG. 2B is a plan view and a shorter-dimension direction cross-section view of the grooves, and FIG. 2C is a perspective view of the grooves shown in FIG. 2B;

FIGS. 3A to 3C are explanatory views of a method for manufacturing a light guide plate according to an embodiment of the present invention, wherein FIG. 3A is a plan view illustrating concave parts that are discretely formed on a molding surface of a die for convenience, FIG. 3B is a perspective view of FIG. 3A, and FIG. 3C is a plan view schematically illustrating the stripe-shaped grooves corresponding to the optical elements and a state in which concave parts that are adjacent during processing partially overlap each other in a plan view of the molding surface of the die;

FIGS. 4A and 4B show examples of a method for forming concave parts that are linear overall by irradiating a laser in a region of the molding surface of the die corresponding to the optical elements, wherein FIG. 4A shows an example in which simple constant pitch processing is carried out in a single groove processing step, and FIG. 4B shows an example in which a first groove processing step is carried out at a feeding pitch that is higher than that of the example in FIG. 4A and then a second groove processing step is carried out to form concave parts at intermediate positions between the concave parts formed in the first groove processing step;

FIGS. 5A to 5D explain the effects achieved by the optical elements of the light guide plate according to an embodiment of the present invention, wherein FIGS. 5A and 5C show an effect of modifying an optical path of the optical elements according to an embodiment of the present invention, FIG. 5B shows an effect of modifying an optical path of optical elements having a V-shaped cross-section as a comparative embodiment of FIG. 5A, and FIG. 5D shows an effect of modifying an optical path of optical elements formed such that adjacent convex parts are arranged discretely from each other as a comparative embodiment of FIG. 5C;

FIG. 6 is a graph comparing the brightness distribution of a light guide plate depending on the presence or absence of the optical elements of the light guide plate according to an embodiment of the present invention;

DETAILED DESCRIPTION OF THE PREFERRED EMBODIMENTS

Embodiments of the present invention will be explained below based on the attached drawings.

Figure 8:
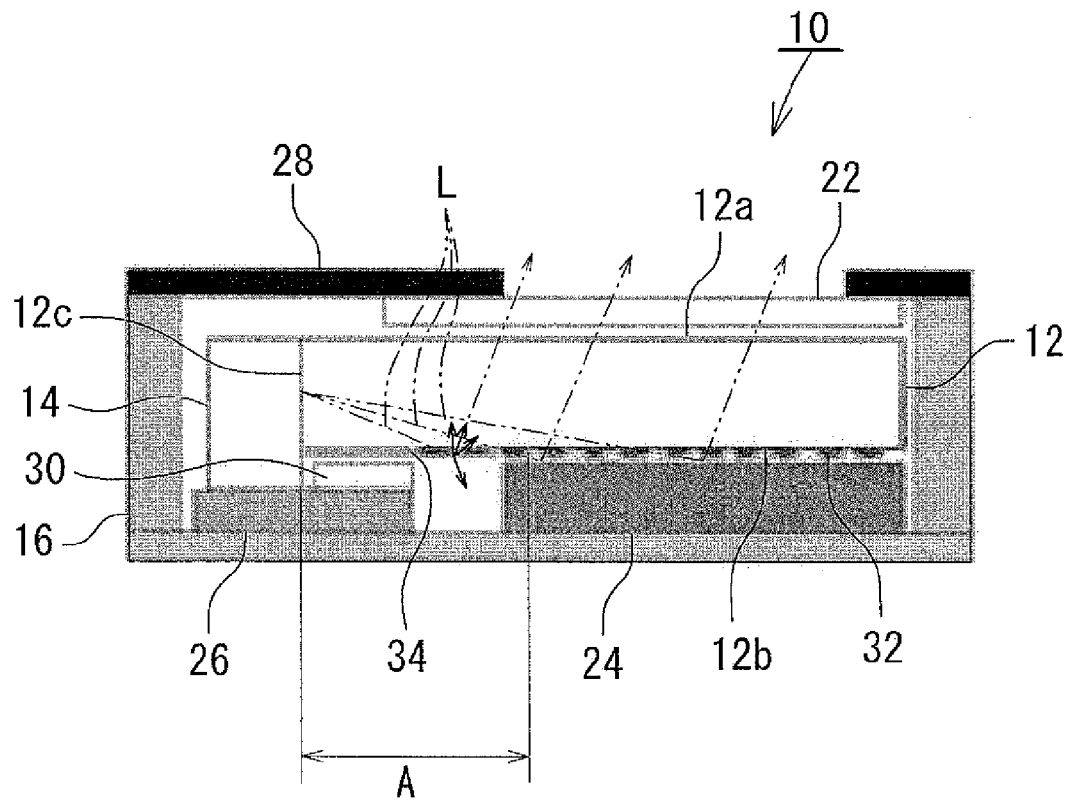
FIG. 8 is a cross-section view schematically illustrating a spread illuminating apparatus according to an embodiment of the present invention.

A spread illuminating apparatus 10 according to an embodiment of the present invention has the structure shown in FIG. 8, and includes a light guide plate 12 having a rectangular shape in a plan view, LEDs 14 that serve as a point light source and are disposed opposing an incident light surface 12c which is one side end surface of the light guide plate 12, and a housing frame 16 for accommodating these constituent elements. The light guide plate 12 includes a pair of principle surfaces 12a and 12b that extend opposing each other from both ends in the shorter-dimension direction of the incident light surface 12c, and one principal surface 12a (top surface) serves as a light emitting surface.

The light guide plate 12 is made by molding a transparent resin material such as an acrylic resin. As the LEDs 14, for example, a white LED of a structure in which a blue light-emitting LED chip is sealed with a translucent resin obtained by mixing yttrium aluminum garnet (YAG) fine particles activated with cerium, which are yellow light-emitting phosphors, into a hardened silicone resin is used. The housing frame 16 is made of a synthetic resin or a metal.

An optical sheet 22 is disposed on the light emitting surface 12a side of the light guide plate 12. Further, a reflective sheet 24 is disposed on the underside surface 12b which is the other principal surface of the light guide plate 12. A frame-shaped light blocking sheet 28 is disposed on the light emitting surface 12a of the light guide plate 12 so as to retain the outer periphery of the optical sheet 22.

A portion of an FPC 26 on which the LEDs 14 are mounted overlaps with the light guide plate 12 in a plan view, and this overlapping portion is adhered and fixed by a double-sided tape 30 to the underside surface 12b of the light guide plate 12.

In addition, a plurality of dots 32 which serve as optical path modifying units that refract light that has entered from the incident light surface 12c toward the light emitting surface 12a side are formed on the underside surface 12b of the light guide plate 12. In the example of FIG. 8, the dots 32 protrude in a dome shape from the surface of the underside surface 12b and are arranged in a pattern that achieves appropriate optical characteristics.

In FIG. 8, the dimensions and positional relationships of the constituent elements are shown for expediency. Therefore, there are spaces shown between the constituent elements, but the constituent elements are actually appropriately arranged to be closely adhered to each other or fixed with double-sided tape or through engagement so as to achieve optimal optical characteristics.

Figure 1A:
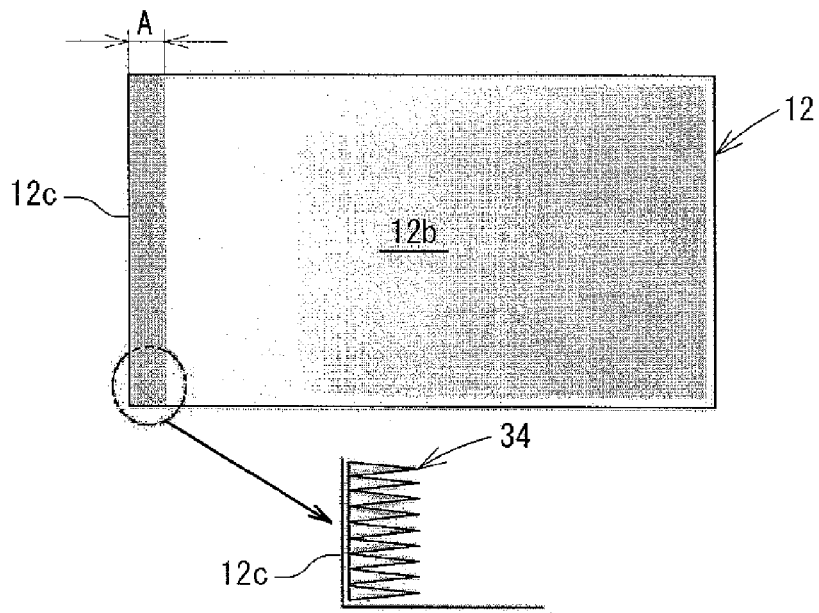
Figure 1B:
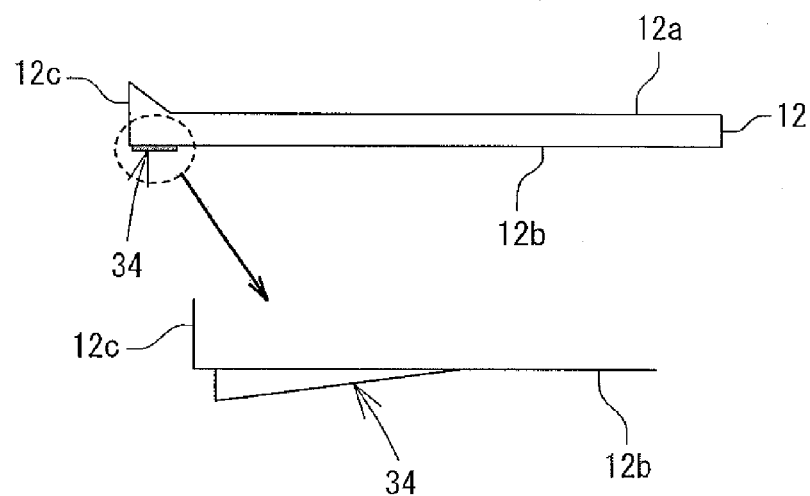

Also, in the light guide plate 12 according to this embodiment of the present invention, a plurality of optical elements 34 are provided along the longitudinal direction of the incident light surface 12c in a region A of a predetermined width from the end adjacent to the incident light surface 12c of the principal surface (underside surface) 12b opposing the emitting surface 12a. The optical elements 34 according to this embodiment of the present invention are formed as protrusions in a stripe shape as schematically shown in FIG. 1A. The optical elements 34 extend parallel to each other toward a direction away from the incident light surface 12c. Further, each optical element 34 is formed such that the protrusion amount from the principal surface 12b gradually decreases as the distance from the incident light surface 12c increases as shown in FIG. 1B. The region A of a predetermined width from the end adjacent to the incident light surface 12c is, for example, set to a non-light-emitting area (a so-called dead area) that is covered and hidden by the frame-shaped light blocking sheet 28 when viewing the light guide plate 12 in a plan view from the light emitting surface 12a side. Also, when a region in which the thickness of the light guide plate decreases moving away from the incident light surface 12c side is provided as shown in FIG. 1B, for example, the region A can be set to approximately correspond to this region.

Figure 1C:
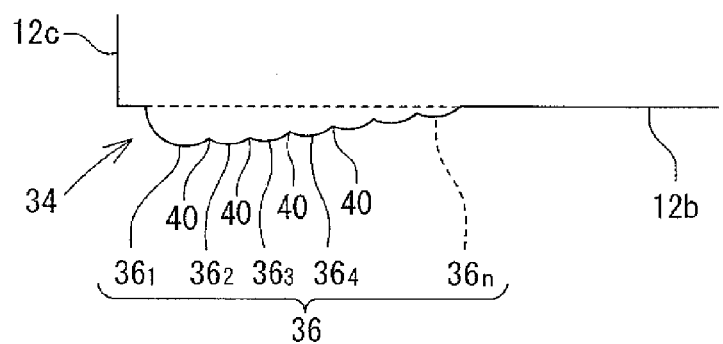
Figure 3A:
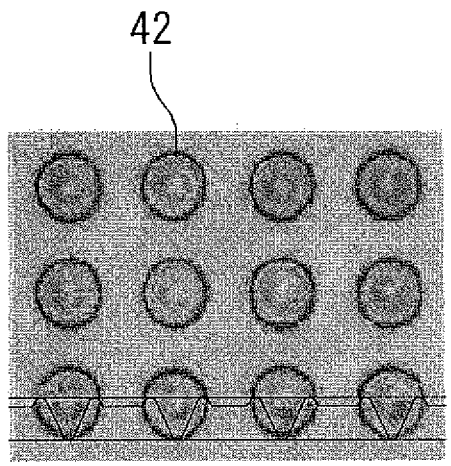
Figure 3B:
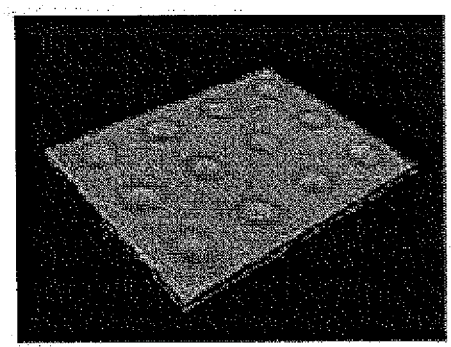
Figure 3C:
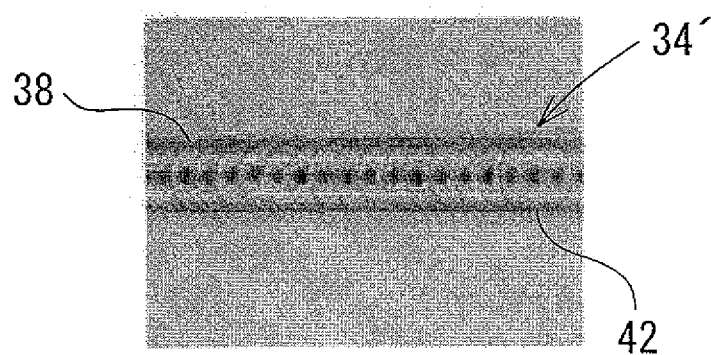

As shown in FIG. 1C, the optical elements 34 according to this embodiment of the present invention include concave/convex shaped parts 36 which are formed to be linear overall by repeatedly aligning concave parts and/or convex parts in the longitudinal direction of the optical elements 34. In the example shown in FIG. 1C, the concave/convex shaped parts 36 that constitute the optical elements 34 are formed by repeatedly aligning a plurality of convex parts $36_1$ to $36_n$ in the longitudinal direction of the optical elements 34. These convex parts $36_1$ to $36_n$ form a convex dome shape transferred by dome-shaped concave parts 42 formed on a die as shown in FIGS. 3A and 3B.

The concave/convex shaped parts 36 are constituted as a continuous body by arranging adjacent convex parts $36_1$ to $36_n$ so that they partially overlap each other in a plan view of the principal surface 12b of the light guide plate 12.

Thus, an arc-shaped part obtained by cutting the convex parts $36_1$ to $36_n$ of FIG. 1C is included in the cross-section of the concave/convex shaped parts 36 along the longitudinal direction of the optical elements 34. Further, ridge lines 40 (if ridge lines 38 as shown in FIGS. 2A to 2C and 3C are formed in the die, the ridge lines 40 are transferred by these ridge lines 38) extending to connect one end side in the shorter-dimension direction of the optical elements 34 to the other end side in an arc shape are formed in the concave/convex shaped parts 36 of the optical elements 34 in a plan view of the principal surface 12b of the light guide plate 12.

Next, a method for manufacturing the light guide plate 12 according to an embodiment of the present invention will be explained below.

Figure 7:
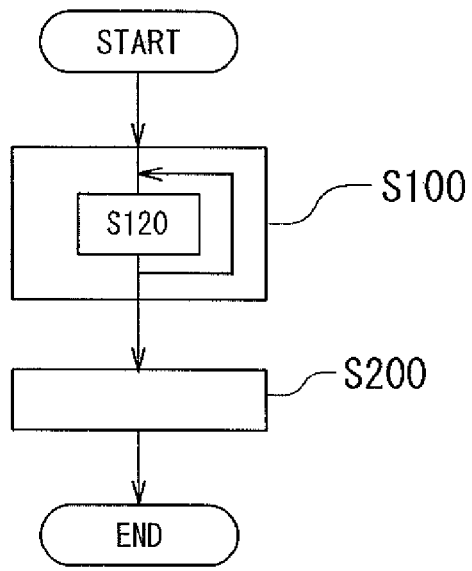
FIG. 7 is a flow chart illustrating the method for manufacturing a light guide plate according to an embodiment of the present invention.

Basically, in the method for manufacturing the light guide plate 12 including the optical elements 34, an operation for forming concave parts and/or convex parts is carried out at a predetermined feeding pitch (which does not need to be constant) so that the concave parts and/or convex parts partially overlap each other in a region of the light guide plate 12 in which the optical elements 34 are to be provided, thereby forming a plurality of the optical elements 34. Further, in this embodiment of the present invention, a die is used in the manufacture of the light guide plate 12 in order to mass-produce the light guide plate 12 including the optical elements 34 with high precision and at low cost. Thus, as shown in FIG. 7, the method for manufacturing the light guide plate 12 according to this embodiment of the present invention includes a die producing step S100 in which a die for molding the light guide plate 12 is produced, and a light guide plate molding step S200 in which the light guide plate 12 is molded using the die produced in the die producing step S100.

The die producing step S100 includes a groove processing step S120. In the groove processing step S120, a plurality of the concave parts 42 as shown in FIGS. 3A and 3B are formed in a region of a molding surface of the die corresponding to the optical elements. Therein, as shown in FIGS. 2A to 2C and 3C, an operation for forming the concave parts is carried out at a predetermined feeding pitch so that the concave parts partially overlap each other, thereby forming grooves 34' corresponding to the optical elements 34. In each operation for forming concave parts in the die producing step S100, the recess amount of the concave parts 42 to be formed is decreased (the farther away the concave part is from the incident light surface 12c).

The shape of the molding surface of the die produced in the die producing step S100 is transferred to a resin for constituting the light guide plate 12 in the light guide plate molding step S200, and thereby the light guide plate 12 including the optical elements 34 is manufactured.

Figure 4A:
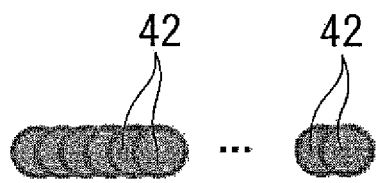

As the operation for forming concave parts in the die producing step S100, the example shown in FIG. 4A consists of forming the concave parts 42 by simple constant pitch processing in a single groove processing step S120. Alternatively, the example shown in FIG. 4B consists of forming concave parts $42_1$ in a first groove processing step S120 carried out at a feeding pitch that is higher than that of the example in FIG. 4A and then forming concave parts $42_2$ in a second groove processing step S120 at intermediate positions between the concave parts $42_1$ formed in the first groove processing step.

Figure 4B:
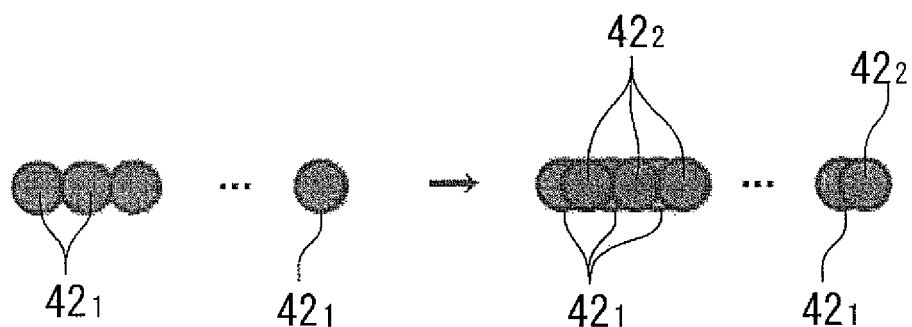

In the processing methods of FIGS. 4A and 4B, even if the pitch of the concave parts 42 that are ultimately formed is the same, the concave/convex structure of the grooves formed in the die will be different. However, the processing method is preferably selected appropriately considering the necessary optical characteristics.

In this embodiment of the present invention, a laser is used in the groove processing step(s) S120. The following explanation is based on the example shown in FIG. 4A. In the operation for forming the concave parts in the die producing step S100, one concave part 42 is formed by irradiating a laser beam, and then the next concave part 42 is formed by shifting the irradiating position of the laser beam by a predetermined distance (a distance that is less than the dimensions of width, length, diameter, etc. of a single concave part 42). When forming each concave part 42, the concave part 42 is formed with a necessary depth by irradiating the laser beam for a predetermined number of shots. The next concave part 42 is formed so that it partially overlaps the concave part 42 which has already been formed. In this case, the most recently formed concave part 42 will have a different shape from the concave parts 42 formed previously, and the most recently formed concave part 42 will be larger than the concave parts 42 formed previously (until a steady state is reached).

Further, an operation in which the position at which the laser beam is to be irradiated is, for example, shifted by the same distance in the same direction to form the next concave part 42 is repeated. Thereby, the plurality of concave parts 42 partially overlap each other, and the concave/convex shaped parts whose recess amount and/or protrusion amount are not constant in the shorter-dimension direction and the longitudinal direction become continuous, such that the grooves 34' are formed to be linear overall.

In this case, the recess amount of the concave parts 42 can be adjusted by the number of irradiation shots of the laser beam (specifically, the depth of each concave part 42 increases as the number of irradiation shots of the laser beam increases). Thus, the plurality of concave parts 42 can be formed such that the recess amount thereof gradually decreases as the distance from the position corresponding to the incident light surface increases.

Also, if a laser is used in the groove processing step(s) S120, the shape of each concave part 42 is formed such that a convex outer ring is formed at the outer edge of the concave part 42 due to the influence of heat during laser irradiation or the like, as can be seen in the cross-section shape indicated by lines in FIGS. 3A and 3B. Regardless of whether it is intentional, these complex concave/convex shapes in which microscopic convex shapes (or concave shapes) overlap with each other contribute to the operational effects of the present invention as will be explained later.

As a specific example of the dimensions of the grooves 34' for forming the optical elements 34 that are constituted by the concave parts 42 of the die, for example, the grooves 34' are provided linearly with a length of 4 mm at a pitch of 110 μm to be parallel to each other in a direction away from the incident light surface 12c of the light guide plate 12. The width (dimension in the shorter-dimension direction) of each groove 34' is 55 μm, the height is 5 μm, and the pitch of the concave part 42 is 10 μm. The pitch is preferably ½ or less (more preferably ⅓ or less) of the dimension in the shorter-dimension direction of the grooves 34'. Further, the concave/convex height difference is preferably greater than 0 and 1 μm or less. However, the present invention is not limited to the above-described dimensions.

As a laser processing machine to be used for the laser processing, for example, a YAG laser, a $YVO_4$ laser, a fiber laser with a fiber-shaped medium, and the like is used. With regard to the wavelength of the laser beam, it is, for example, 1.06 μm or the like. However, the present invention is not limited to such solid lasers or the above wavelength, and a gas laser such as a $CO_2$ laser, a semiconductor laser, a liquid laser, and the like can also be used.

The following operational effects can be achieved by the above-described embodiments of the present invention having the above-described structures.

An optical path of light L that enters from the incident light surface 12c of the light guide plate 12 is modified by the concave/convex shaped parts 36 that constitute the optical elements 34 as the light L progresses through the inside of the light guide plate 12, and thereby the light L is diffused. Thus, in addition to reductions in brightness unevenness that is visible when viewing the emitting surface of the light guide plate from the front direction, reductions in brightness unevenness that is visible when viewing the emitting surface of the light guide plate from a diagonal direction can also be achieved. Furthermore, the recess amount and/or protrusion amount of the concave/convex shaped parts 36 are not constant in the shorter-dimension direction and the longitudinal direction, and thus the optical path of the light L progressing through the inside of the light guide plate 12 is modified randomly. Therefore, a diffusing effect of the light L is efficiently exhibited. In addition, by providing a plurality of the optical elements 34 partially so as to correspond to the individual LEDs 14 (for example, providing optical elements 34 to only a portion(s) of the region A rather than the entire region A as necessary, such as by providing them in a plurality of discrete regions corresponding to the individual LEDs 14 along the incident light surface 12c of the light guide plate 12), the above-described operational effects can be effectively achieved.

The optical elements 34 according to this embodiment include concave/convex shaped parts 36 constituted by repeatedly aligning the dome-shaped convex parts $36_1$ to $36_n$ so that adjacent convex parts $36_1$ to $36_n$ partially overlap each other in the longitudinal direction of the optical elements 34. The recess amount and/or protrusion amount of the concave/convex shaped parts 36 are not constant due to the three-dimensional curved surfaces that constitute the convex parts $36_1$ to $36_n$.

In other words, in the concave/convex shaped parts 36, the convex parts $36_1$ to $36_n$ are repeatedly aligned in the longitudinal direction of the optical elements 34, and thus the cross-section shapes of the optical elements 34 are not constant and the area of the cross-section in a direction orthogonal to the longitudinal direction of the optical elements 34 repeatedly increases/decreases in the longitudinal direction without becoming zero. Alternatively, in the optical elements 34, the concave/convex shapes are repeated in the longitudinal direction over the surface layer thereof. Thereby, the shape of the optical elements 34 is not constant (the cross-section area does not decrease monotonically) and the optical elements 34 exhibit high-level anisotropy, and thus the above-described operational effects are effectively achieved.

In the present embodiment, an arc-shaped part obtained by cutting the convex parts $36_1$ to $36_n$ is included in the cross-section of the concave/convex shaped parts 36 that constitute the optical elements 34 along the longitudinal direction of the optical elements 34. Therefore, the inclination angle of the three-dimensional curved surfaces that constitute the convex parts $36_1$ to $36_n$ is not constant toward the longitudinal direction of the optical elements 34 and changes according to the arc shape. Thus, the optical path of the light L that progresses through the inside of the light guide plate 12 is randomly modified toward different directions at different positions in the longitudinal direction of the optical elements 34, and a diffusing effect of the light L is efficiently exhibited.

Figure 5A:
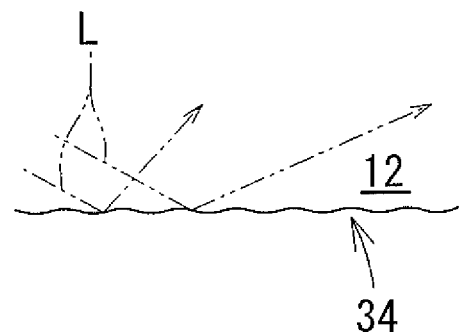
Figure 5B:
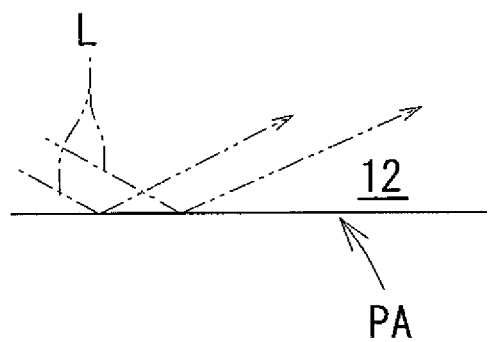

FIGS. 5A and 5B schematically show by the path (arrow marks) of the light L the optical path modifying effect of the optical elements 34 (whose side surfaces which are reflecting surfaces form curved surfaces) according to the present embodiment and the optical path modifying effect of conventional optical elements PA (whose side surfaces which are reflecting surfaces form flat surfaces) having a V-shaped cross-section. As is clear upon comparing the two, the optical path of the light L of the optical elements 34 according to the present embodiment is effectively diffused as shown in FIG. 5A such that various points of brightness unevenness in the spread illuminating apparatus 10 are effectively eliminated. Even if the cross-section shape of the conventional optical elements PA was an arc shape, the optical path modifying effect in the longitudinal direction would still be as shown in FIG. 5B, and thus the optical elements 34 according to the present embodiment are clearly superior with regard to the elimination of brightness unevenness.

In the present embodiment, ridge lines 40 extending to connect one end side in the shorter-dimension direction of the optical elements 34 to the other end side in an arc shape are included in the concave/convex shaped parts 36 in a plan view of the principal surface 12b (an arc-shaped part is included in the cross-section in the longitudinal direction). Therefore, the inclination angle in the shorter-dimension direction is also not constant and changes according to the arc shape. Thus, a light diffusing effect is efficiently exhibited with respect to this point as well. Further, the inclination angle of the three-dimensional curved surface that constitutes each concave/convex shaped part 36 changes rapidly crossing over the ridge lines 40. Therefore, the modification direction of the optical path of the light L that progresses through the inside of the light guide plate 12 clearly differs as the optical path crosses over the ridge lines 40, and thus a diffusing effect of the light L is efficiently exhibited.

In the present embodiment, the concave/convex shaped parts 36 are constituted as a continuous body by arranging adjacent convex parts $36_1$ to $36_n$ so that they partially overlap each other in a plan view of the principal surface 12b. Thereby, compared to a concave/convex shaped part in which adjacent convex parts $36_1$ to $36_n$ are formed to be arranged discretely, the inclination angle of the three-dimensional curved surface that constitutes the concave/convex shaped part can be appropriately set.

Figure 5C:
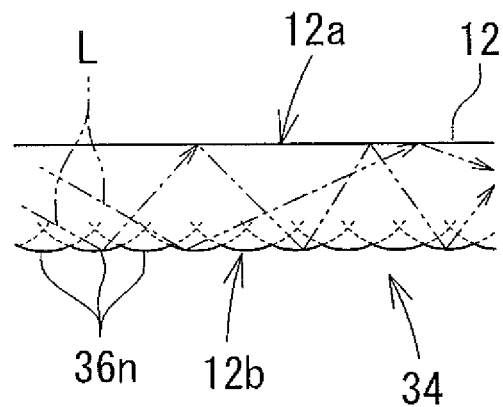
Figure 5D:
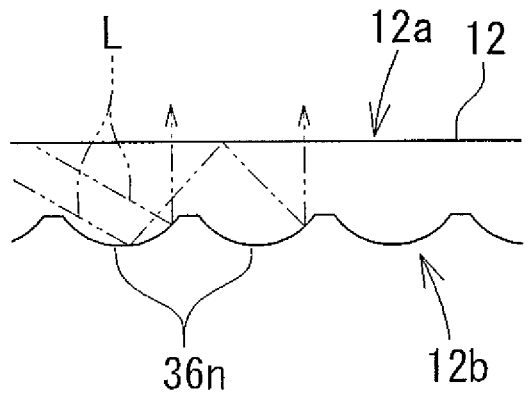

FIG. 5C shows an effect of modifying the optical path of the optical elements 34 according to the present embodiment, and FIG. 5D shows an effect of modifying the optical path of optical elements formed such that adjacent convex parts $36_n$ are arranged discretely from each other as a comparative embodiment of FIG. 5C. If each convex part $36_n$ is constituted by a three-dimensional curved surface whose inclination angle changes regularly such as a dome shape as shown, the inclination angle of the three-dimensional curved surface (the angle of the line tangent to the principal surface) increases approaching the outer edge parts (refer to FIG. 5D).

As shown in FIG. 5C, if adjacent convex parts are arranged to partially overlap each other, the outer edge parts of the three-dimensional curved surface that constitutes each convex part are clipped off by adjacent convex parts such that they become linearly arranged. Since the outer edge parts which have a large inclination angle are clipped off, the effect of modifying the optical path of the light L that progresses through the inside of the light guide plate 12 is reduced, which allows for an increase in the amount of the light L that progresses farther from the incident light surface. Therefore, the amount of light emitted from regions of the emitting surface 12a of the light guide plate 12 that are farther from the incident light surface 12c (FIG. 8) increases, and thus a diffusing effect of the light L can be efficiently exhibited. Further, the amount of light emitted from dead areas is suppressed, and thus the efficiency of light utilization is enhanced (reductions in the efficiency of light utilization are suppressed).

In the present embodiment, the convex parts $36_n$ that constitute each concave/convex part 36 are dome-shaped, and a plurality of the convex parts $36_n$ are continuously formed to be linear overall. Thereby, the above-described effects are achieved.

In the present embodiment, the optical elements 34 extend parallel to each other in a direction away from the incident light surface 12c. Thereby, the optical path of the light L that enters from the incident light surface 12c of the light guide plate 12 is randomly modified by the concave/convex shaped parts 36 that constitute the optical elements 34 while the light L is progressing through the inside of the light guide plate 12 toward a direction away from the incident light surface 12c. Thus, the above-described effects are achieved.

In the present embodiment, the optical elements 34 are formed such that the protrusion amount and/or recess amount of the concave/convex shaped parts 36 decreases as the distance from the incident light surface 12c increases, and thus the average width of the optical elements 34 that are formed to be linear overall decreases towards the distal tip thereof, whereas the average height (or depth) decreases towards the distal tip. Therefore, if each convex part $36_n$ is constituted by a three-dimensional curved surface whose inclination angle changes regularly such as a dome shape, the inclination angle of the three-dimensional curved surface that constitutes the convex part $36_n$ at the outer edge parts of the convex part $36_n$ becomes gentler as the protrusion amount and/or recess amount decreases. Thus, the effect of modifying the optical path of the light L that progresses through the inside of the light guide plate 12 is reduced toward the distal tip of the optical elements 34, and the perception of bright lines on the emitting surface 12a of the light guide plate 12 can be avoided.

FIG. 6 compares the brightness distribution in a region in a portion of the direction along the incident light surface 12c of the light guide plate 12 between a light guide plate including the optical elements 34 according to the present embodiment and a conventional light guide plate that does not include the optical elements 34. In the example of FIG. 6, 18 LEDs 14 were disposed at the incident light surface 12c of an 8-inch light guide plate 12. Therein, it can be interpreted that fluctuations in the brightness distribution of the brightness I according to the present embodiment are greatly improved compared to the conventional brightness PA.

Further, according to research conducted by the present inventors, upon measuring the average brightness of illumination light emitted from the emitting surface 12a of the light guide plate 12, no decreases in brightness were confirmed due to providing the optical elements 34 according to the present embodiment.

If a portion of the FPC 26 on which the LEDs 14 are mounted overlaps with the light guide plate 12 in a plan view and this overlapping portion is adhered and fixed by the double-sided tape 30 to the underside surface 12b of the light guide plate 12 as shown in FIG. 8, any air bubbles localized between the double-sided tape 30 and the light guide plate 12 can be eliminated by the presence of the optical elements 34.

The FPC 26 may be formed to have uneven portions on the surface by configuring it to have a structure such as through holes. If the double-sided tape 30 cannot flexibly conform to these uneven portions, air bubbles (an air layer) may be formed between the light guide plate 12 and the FPC 26. The location at which such air bubbles are produced is not fixed and is localized, and brightness unevenness caused by such air bubbles may occur. However, by forming the optical elements 34 on the surface of the light guide plate 12, the optical elements 34 become an escape route for the air bubbles, and thus an effect of eliminating localized air bubbles can be achieved. Alternatively, the optical elements 34 achieve an effect of obscuring any brightness unevenness caused by the air bubbles. The optical elements 34 are particularly effective if they extend parallel to each other and at equal intervals toward a direction way from the incident light surface.

The optical elements 34 do not necessarily have to be parallel to each other, and can be, for example, formed to be polygonal, curved, or a circular stripe (according to the configuration of the brightness unevenness) considering the necessary optical characteristics. Also, a plurality of the optical elements 34 can be configured to extend radially with the LEDs 14 as a base point, or a plurality of the optical elements 34 can be configured to form an asymmetrical pattern shape relative to the optical axis of the LEDs 14. In addition, the optical elements 34 can be configured in a meandering manner in a plan view.

On the incident light surface 12c of the light guide plate 12, a so-called incident light prism (not shown) for controlling the orientation within the light guide plate 12 of light emitted from the LEDs 14 to reduce brightness unevenness can be provided. If the incident light prism is provided, for example, a plurality of optical elements 34 are preferably disposed according to the embodiment of the incident light prism to enable further reductions in brightness unevenness by the orientation that is controlled by the incident light prism and the synergistic effects of the optical elements 34.

If necessary, instead of configuring the optical elements 34 such that the protrusion amount and/or recess amount of the concave/convex shaped parts 36 decreases as the distance from the incident light surface 12c increases, they can be configured such that the average protrusion amount and/or recess amount of the concave/convex shaped parts 36 does not change across their entire length.

The full lengths of the optical elements 34 do not need to be the same, and the positions of the distal ends of the optical elements 34 can differ within a range of the region A having a predetermined width from the end adjacent to the incident light surface 12c. The optical elements 34 can also be formed such that they regularly or irregularly undulate. Further, the optical elements 34 can be multiply divided in the longitudinal direction.

In the present embodiment, the optical elements 34 are provided on the underside surface 12b of the light guide plate 12. However, the optical elements 34 can be provided on the emitting surface 12a side, or on both principal surfaces 12a and 12b.

In the present embodiment, the optical elements 34 are constituted by the convex parts $36_n$. However, the above-described operational effects can be appropriately achieved even if the convex parts $36_n$ are concave shaped or include a mixture of concave and convex shaped parts.

The pitch of the convex parts $36_n$ can be changed along the longitudinal direction of the optical elements 34, and can be changed between adjacent optical elements 34. Thereby, the optical path modifying effect of the optical elements 34 can be adjusted for each small region, so as to adapt to the necessary optical characteristics (embodiment of the brightness unevenness) with high dimensionality.

The method for manufacturing the light guide plate according to the embodiment of the present invention includes a die producing step S100 in which a die for molding the light guide plate 12 is produced, and the light guide plate 12 is molded in a light guide plate molding step S200 using the die produced in the die producing step S100. Further, the die producing step S100 includes a groove processing step(s) S120, in which a plurality of concave parts 42 are formed in a region of a molding surface of the die corresponding to the optical elements 34, and therein, an operation for forming the concave parts is carried out at a predetermined feeding pitch so that the concave parts 42 partially overlap each other, thereby forming grooves 34' corresponding to the optical elements 34. In the light guide plate molding step S200, the shape of the molding surface of the die produced in the die producing step S100 is transferred to a resin for constituting the light guide plate 12, and thereby the optical elements 34 are molded.

In the die producing step S100, when carrying out the operation for forming the concave parts at a predetermined feeding pitch in a region of the die in which the grooves 34' are to be molded, the grooves 34' corresponding to the optical elements 34 are formed such that the recess amount of the concave parts 42 to be formed is decreased in each operation for forming concave parts. In the light guide plate molding step S200, by transferring the shape of the molding surface of the die produced in the die producing step S100 to a resin for constituting the light guide plate 12, the optical elements 34 are formed such that the protrusion amount and/or recess amount of the concave/convex shaped parts 36 decreases as the distance from the incident light surface 12c of the light guide plate 12 increases. As a result, the inclination angle of the three-dimensional curved surface that constitutes each convex part at the outer edge parts of the convex part becomes gentler at an end of the optical elements 34 formed to be linear overall that is farthest from the incident light surface 12c of the light guide plate 12. Thus, the effect of modifying the optical path of the light L that progresses through the inside of the light guide plate 12 is reduced at the end farthest from the incident light surface 12c of the light guide plate 12, and the perception of bright lines on the emitting surface 12a of the light guide plate 12 can be avoided.

In the die producing step S100, when forming the grooves 34' corresponding to the optical elements 34, rather than forming the grooves 34' of a desired shape in a single groove forming step, the grooves 34' of a desired shape can be obtained through the plurality of groove processing steps S120. In other words, in a first groove processing step S120, the concave parts 42$_1$ are formed so that they do not partially overlap each other as shown in FIG. 4B. Therein, as necessary, the concave parts 42$_1$ can be formed discretely by providing a space between the concave parts 42$_1$, or the concave parts 42$_1$ can be formed so that they partially overlap each other.

In a second and subsequent groove processing steps S120, an operation for forming the concave parts 42$_2$ is carried out at a predetermined feeding pitch at intermediate positions between adjacent concave parts 42$_1$ formed in the previous groove processing step(s), and thereby the concave parts 42$_1$ and 42$_2$ are formed more adjacent to each other such that they partially overlap each other. Further, the overlap between the concave parts is arbitrarily adjusted according to the number of groove processing steps S120 to be carried out.

In this embodiment of the present invention, the groove processing step(s) S120 is carried out by a laser irradiation step. In other words, the plurality of concave parts 42 are formed by carrying out laser irradiation in the region of the molding surface of the die corresponding to the optical elements 34. In doing so, a laser beam is irradiated at a predetermined feeding pitch to form the concave parts 42 such that they are adjacent to each other and partially overlap each other, thereby forming the grooves 34' corresponding to the optical elements 34. Further, the groove processing is carried out by pulse oscillation of the laser beam when irradiating it on the die, and thereby the processing of grooves 34' whose shapes are not constant and exhibit anisotropy including three-dimensional curved surfaces can be carried out in a short amount of time.

Also, the recess amount of the concave parts 42 to be formed is appropriately adjusted by adjusting the number of irradiation shots of the laser beam. Thus, by arbitrarily modifying the depth of the groove 34' that are formed on the die according to the position in the longitudinal direction of the grooves 34', the height of the optical elements 34 on the light guide plate 12 that are transferred from the grooves 34' can be arbitrarily changed at the position in the longitudinal direction of the optical element 34.

If a plurality of dots 32 which serve as optical path modifying units that emit illumination light in a spread pattern from the emitting surface 12a are formed on the underside surface 12b of the light guide plate 12 as shown in FIG. 8, the grooves 34' for molding the optical elements 34 and the concave parts for molding the dots 32 can be produced on the die with the same equipment/steps. Thus, the manufacturing process can be streamlined and the labor thereof can be reduced.

Even if the optical elements 34 are molded directly on a light guide plate base material made of a resin without using a die, the same operational effects as when the grooves 34' for molding the optical elements 34 are formed on the die can be achieved. In particular, using a laser beam for processing facilitates the processing of the optical elements 34 when the light guide plate base material consists of a thin panel. In addition, the optical elements 34 can also be directly molded on a light guide plate base material made of a resin using an inkjet method.

What is claimed is:

1. A spread illuminating apparatus comprising:
a light source; and
a light guide plate including an incident light surface at which the light source is disposed and a principal surface adjacent to the incident light surface,
wherein a plurality of optical elements are formed, each of the optical elements extending linearly in a direction away from the incident light source, and being provided in a region of the principal surface of the light guide plate having a predetermined width from an end adjacent to the incident light surface, and
each optical element has concave parts and/or convex parts repeatedly aligned in a longitudinal direction of the optical elements.

2. The spread illuminating apparatus according to claim 1, wherein the concave/convex shaped part is arranged such that adjacent concave parts or convex parts partially overlap each other in a plan view of the principal surface.

3. The spread illuminating apparatus according to claim 1, wherein an arc-shaped part is included in a cross-section of the concave/convex shaped part along the longitudinal direction of the optical elements.

4. The spread illuminating apparatus according to claim 1, wherein a ridge line extending to connect one end side in a shorter-dimension direction of the optical elements to the other end side in an arc shape is included in the concave/convex shaped part in a plan view of the principal surface.

5. The spread illuminating apparatus according to claim 1, wherein the concave parts and/or convex parts that constitute the concave/convex shaped part are dome-shaped.

6. The spread illuminating apparatus according to claim 1, wherein the optical elements extend parallel to each other in a direction away from the incident light surface.

7. The spread illuminating apparatus according to claim 1, wherein the optical elements are formed such that a protruding protrusion amount and/or recessed amount of the concave/convex shaped parts decreases as the distance from the incident light surface increases.

8. A spread illuminating apparatus comprising:
a light source; and
a light guide plate including an incident light surface at which the light source is disposed and a principal surface adjacent to the incident light surface,
wherein a plurality of optical elements are formed linearly only in a dead area defining a region of the principal surface of the light guide plate having a predetermined width from an end adjacent to the incident light surface, and each optical element has concave parts and/or convex parts repeatedly aligned in a longitudinal direction of the optical element.

9. The spread illuminating apparatus according to claim 8, wherein the concave/convex shaped part is arranged such that adjacent concave parts or convex parts partially overlap each other in a plan view of the principal surface.

10. The spread illuminating apparatus according to claim 8, wherein an arc-shaped part is included in a cross-section of the concave/convex shaped part along the longitudinal direction of the optical elements.

11. The spread illuminating apparatus according to claim 8, wherein a ridge line extending to connect one end side in a shorter-dimension direction of the optical elements to the other end side in an arc shape is included in the concave/convex shaped part in a plan view of the principal surface.

12. The spread illuminating apparatus according to claim 8, wherein the concave parts and/or convex parts that constitute the concave/convex shaped part are dome-shaped.

13. The spread illuminating apparatus according to claim 8, wherein the optical elements extend parallel to each other in a direction away from the incident light surface.

14. The spread illuminating apparatus according to claim 8, wherein the optical elements are formed such that a protruding protrusion amount and/or recessed amount of the concave/convex shaped parts decreases as the distance from the incident light surface increases.

15. A spread illuminating apparatus comprising:
a light source; and
a light guide plate including an incident light surface at which the light source is disposed and a principal surface adjacent to the incident light surface, wherein a plurality of optical elements are formed linearly in a region of the principal surface of the light guide plate having a predetermined width from an end adjacent to the incident light surface, each optical element has concave parts and/or convex parts repeatedly aligned in a longitudinal direction of the optical element, and the repeated alignment of the concave parts and/or convex parts continues in a condition that increases and decreases in a sectional area of each optical element orthogonally crossing the longitudinal direction of the optical element does not become zero.

16. The spread illuminating apparatus according to claim 15, wherein the concave/convex shaped part is arranged such that adjacent concave parts or convex parts partially overlap each other in a plan view of the principal surface.

17. The spread illuminating apparatus according to claim 15, wherein an arc-shaped part is included in a cross-section of the concave/convex shaped part along the longitudinal direction of the optical elements.

18. The spread illuminating apparatus according to claim 15, wherein a ridge line extending to connect one end side in a shorter-dimension direction of the optical elements to the other end side in an arc shape is included in the concave/convex shaped part in a plan view of the principal surface.

19. The spread illuminating apparatus according to claim 15, wherein the concave parts and/or convex parts that constitute the concave/convex shaped part are dome-shaped.

20. The spread illuminating apparatus according to claim 15, wherein the optical elements extend parallel to each other in a direction away from the incident light surface.

21. The spread illuminating apparatus according to claim 15, wherein the optical elements are formed such that a protruding protrusion amount and/or recessed amount of the concave/convex shaped parts decreases as the distance from the incident light surface increases.

* * * * *